Sept. 21, 1948.  F. S. SLATER  2,449,725
FORM FOR MOLDING CONCRETE WALLS
Filed April 26, 1945  2 Sheets-Sheet 1
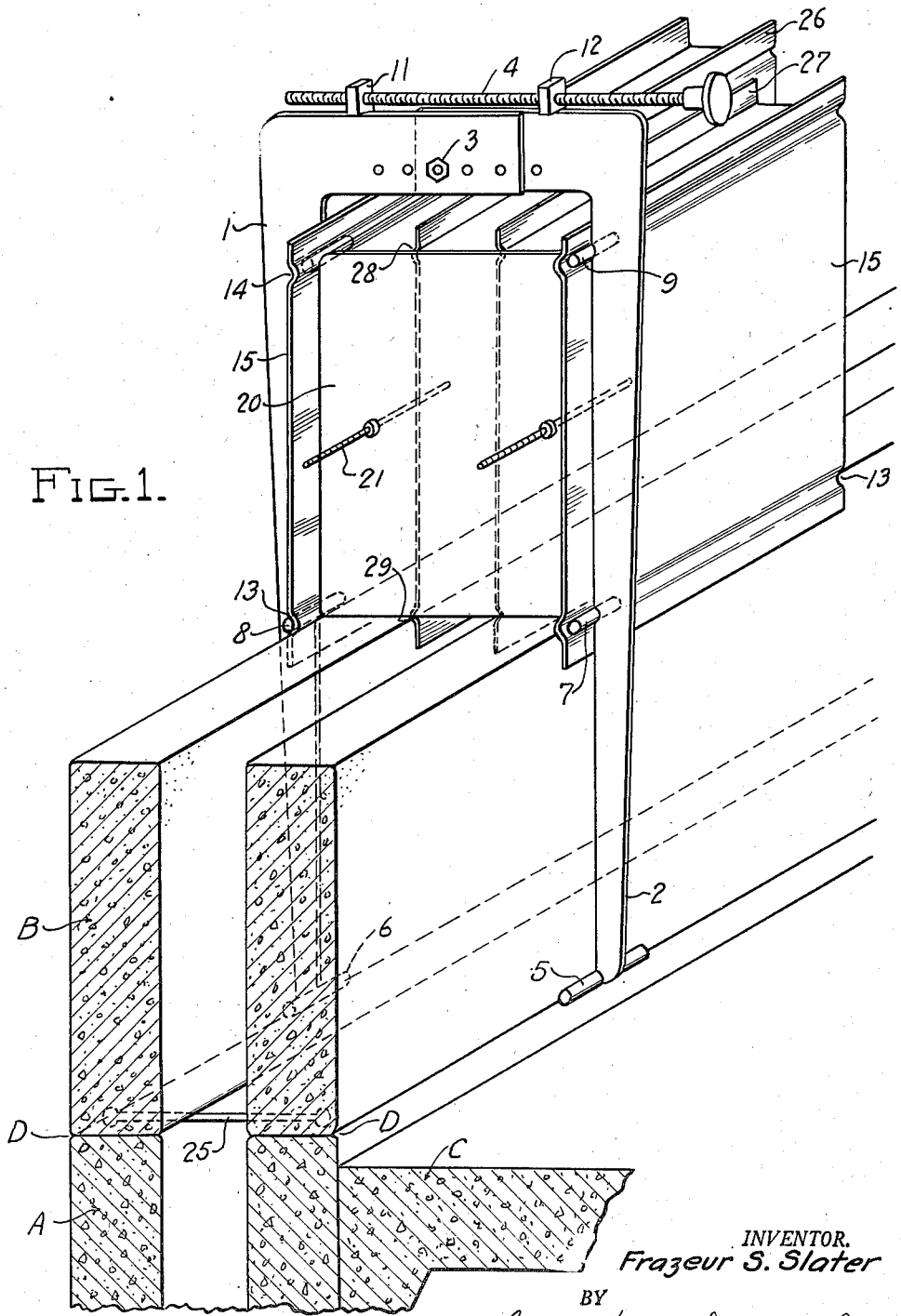
INVENTOR.
Frazeur S. Slater
BY
Barnes, Kisselle, Laughlin & Raisch
ATTORNEYS Sept. 21, 1948.  F. S. SLATER  2,449,725
FORM FOR MOLDING CONCRETE WALLS
Filed April 26, 1945  2 Sheets-Sheet 2
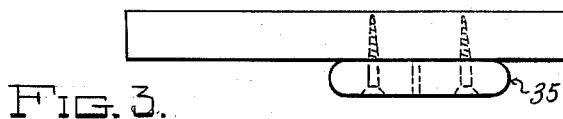
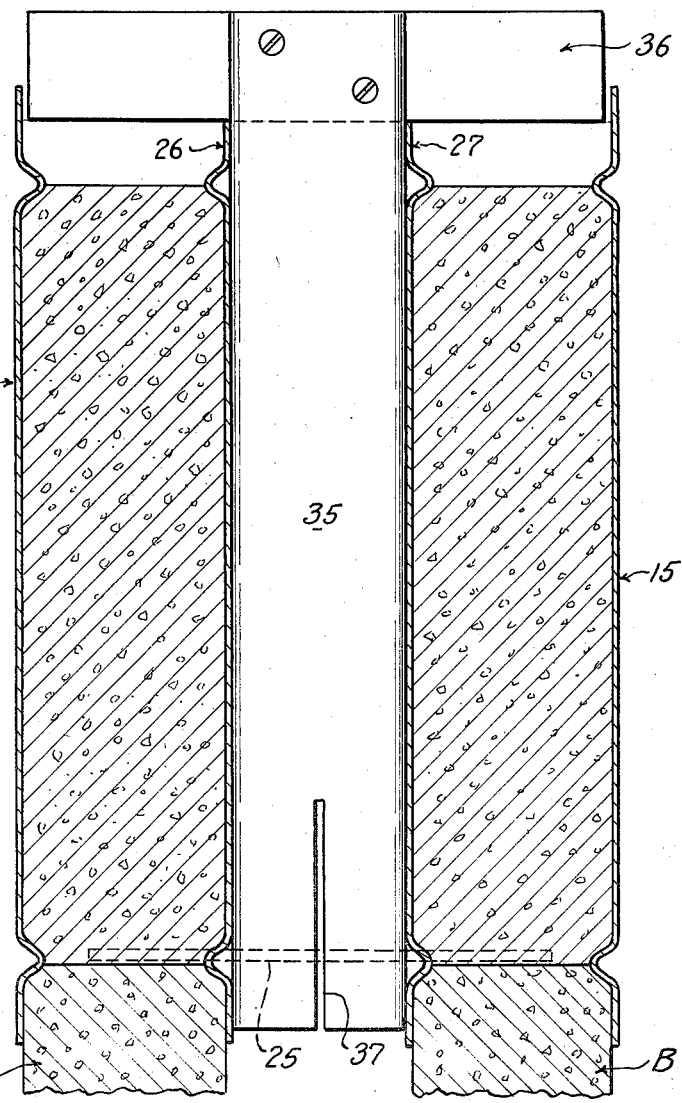
INVENTOR.
Frazeur S. Slater
BY
ATTORNEYS Patented Sept. 21, 1948

2,449,725

UNITED STATES PATENT OFFICE 2,449,725

FORM FOR MOLDING CONCRETE WALLS

Frazeur S. Slater, Chicago, Ill.

Application April 26, 1945, Serial No. 590,336

7 Claims. (Cl. 25—131)

This application relates to a form for molding concrete walls.

It is an object of the present invention to provide a form which can be easily operated by an unskilled laborer and which may be used in the construction of small buildings.

The form to be described is particularly useful in the building of structures a portion at a time with small concrete mixes. It contemplates the erection of a structure with multiple tiers of concrete, each of which is formed individually after the preceding one has been properly set and the same form is used for each tier, the form being raised after each pouring.

Another object of the invention is the provision of a form for this purpose which properly locates itself as it is adjusted upwardly and which is readily positioned and removed. Other objects and features of the invention relating to details of construction and operation will be brought out in the following description and claims.

In the drawings:

Fig. 1 is a perspective view showing all of the elements of the form in position.

Fig. 2 is a sectional view illustrating the manner in which the inner members of the form are separated and spaced.

Fig. 3 is a plan view of the spacer.

In Fig. 1 two tiers A and B are shown with a portion of floor C. The tiers are formed so that they provide a groove D at the top and bottom of each molded section as they are built up. Two L-shaped members 1 and 2 pivoted at 3 serve to support the forms. The threaded member 4, having left-hand and right-hand threads on each end, respectively, cooperates with threaded nuts 11 and 12 mounted on parts 1 and 2, respectively. Enough play is left in tapping threads in nuts 11 and 12 to permit slight angular movement of parts 1 and 2. If more movement is desired nuts 11 and 12 may be pivotally mounted on angles 1 and 2.

The angles 1 and 2 are each provided with a series of spaced holes through which the pivot 3 may pass. Thus the clamps may be used for walls of varying thickness by simply altering the pivot point 3.

Members 5 and 6 at the lower ends of parts 1 and 2 fit into the grooves D to position the members 1 and 2 vertically. Transverse members 7, 8, 9 and 10 cooperate with parallel grooves 13 and 14 in outside plates 15 to position the plates vertically. The pressed-in portion of grooves 13 rest on the curved upper edges of tier B to further locate the form. A suitable end plate or stop 20 may be positioned at any place along the tier to accommodate an end, a door or window. If a tier is to be joined, reinforcing tier members 21 may be inserted through the end plate 20.

The tiers are formed of spaced portions which are tied together by rods 25. Inside plates 26 and 27 form the inner surfaces of the tiers. Notches are provided at spaced intervals in the inner plates to accommodate the rods 25. Grooves 28 and 29 in the inner plates correspond with grooves 13 and 14 in the outer plates.

In order to space the form plates prior to a pour, a T-shaped spacer formed of a vertical member 35 and a horizontal member 36 is provided. Vertical member 35 has a slit 37 at the bottom to enable it to be forced between the formed tiers in case of slight variation in dimensions.

The cross bar 36 rests on plates 26 and 27 and projects over to contact the upper edges of outside plates 15 which extend higher than the inner plates.

Thus the single member 35—36 serves to space both inner and outer plates. The edges of bar 35 are rounded so that it may be rotated and readily withdrawn after the pour has hardened.

The groove-forming beads on the mold plates cooperate with the locating clamps to define the tiers during each pour. However, another equally important feature thereof is the grooved formation imparted to the concrete wall eliminating unsightly joint marks and providing softer break-up lines desirable from an architectural point of view. These grooves also provide a guide for nails that may be driven into the wall to secure any covering such as paneling on structural members.

What I claim is:

1. A mold to be used in the construction of a lateral tier as a part of a concrete wall, which comprises outside plates to define outer surfaces, inside plates to define surfaces of an air chamber, each of said plates being formed to have a groove and rib adjacent each edge, said rib being adapted to rest on formed edges of a supporting tier at the bottom, and to form grooves in the tiers at the top and bottom edges, and means to retain said plates in position during a pour comprising pivoted clamping members extending to each side of said outer plates, means on the ends thereof to register with a groove in a formed tier, spaced means to register with the grooves in said outer plates, a spacing means between said plates, and means to apply force to said clamping members to clamp the plates in position.

2. A mold adapted for use in the construction of a plastic wall comprising a plurality of sections in the form of a tier with the junctions between adjacent sections at the outer face of the tier being substantially parallel straight lines, said mold comprising a pair of plates each having a rib extending along and spaced from one edge of the plate to provide an overlap portion between the rib and said edge of the plate, said rib serving to form the said junction line between adjacent sections, retainer means for retaining said plates in parallel spaced relation to receive a plastic therebetween and to define the section being formed, said retainer means extending beyond the above said overlap edges of each of said plates, and upper and lower means carried by each of the extended portions of said retainer means and spaced a distance substantially equal to the distance between the said junction lines in said tier, said upper means interengaging the plate at said rib and said lower means being adapted to engage the two previously formed sections at their junction line whereby each mold plate may be accurately positioned with respect to the second previously formed section regardless of the extent the last formed section has settled whereby upon pouring the plastic between said plates the overlapping portion and rib of each of said plates is adapted to cooperate with the plastic to complete and perfect the last previously formed section in case of shrinkage.

3. A mold adapted for use in the construction of a plastic wall comprising a plurality of sections in the form of a tier with the junctions between adjacent sections at the outer face of the tier being substantially parallel straight grooves, said mold comprising a pair of plates each having a rib on its inner face extending along and spaced from one edge of the plate to provide an overlap portion between the rib and the said edge of the plate, said rib serving to form the said junction groove between adjacent sections, retainer means for retaining said plates in parallel spaced relation to receive a plastic therebetween and to define the section being formed, said retainer means having legs extending beyond the above said overlap edges of each of said plates, and upper and lower means carried by each of the extended portions of said legs and spaced a distance substantially equal to the distance between the said junction grooves in said tier, said upper means interengaging the plate at said rib and said lower means being adapted to engage the two previously formed sections in their junction groove whereby each mold plate may be accurately positioned with respect to the second previously formed section regardless of the extent the last formed section has settled whereby upon pouring the plastic between said plates the overlapping portion and rib of each of said plates is adapted to cooperate with the plastic to complete and perfect the last previously formed section in case of shrinkage.

4. A mold adapted for use in the construction of a plastic wall comprising a plurality of sections in the form of a tier with the junction between adjacent sections at the outer face of the tier being substantially parallel straight grooves, said mold comprising a pair of plates each having a rib on its inner face extending along and spaced from one edge of the plate to provide an overlap portion between the rib and the said edge of the plate, said rib serving to form the said junction groove between adjacent sections, a clamp in the form of an inverted U straddling the outer sides of said plates for retaining said plates in parallel spaced relation to receive a plastic therebetween and to define the section being formed, the legs of said U clamp extending beyond the above said overlap edges of each of said plates, and upper and lower registering means carried by each of said legs and spaced a distance substantially equal to the distance between the said junction grooves in said tier, said upper registering means interengaging the plates in said ribs and said lower registering means being adapted to engage the two previously formed sections in their junction grooves whereby each mold plate may be accurately positioned with respect to the second previously formed section regardless of the extent the last formed section has settled whereby upon pouring the plastic between said plates the overlapping portion and rib of each of said plates is adapted to cooperate with the plastic to complete and perfect the last previously formed section in case of shrinkage.

5. A mold adapted for use in the construction of a plastic wall comprising a plurality of sections in the form of a tier with the junctions between adjacent sections at the outer face of the tier being substantially parallel straight grooves, said mold comprising a pair of plates each having a rib on its inner face extending parallel and adjacent to the lower edge of the plate to provide an overlap portion between the rib and the said edge of the plate, each plate also having a rib on its inner face extending parallel to the aforementioned rib and spaced above the aforementioned rib a distance equal to the distance between the grooves in said tier, said ribs serving to form the said junction groove between adjacent sections, a clamp in the form of an inverted U straddling the outer sides of said plates for retaining said plates in parallel spaced relation to receive a plastic therebetween and to define the section being formed, the legs of said U clamp extending beyond the lower overlap edge of each of said plates, and upper, lower and intermediate registering means carried by each of said legs and spaced vertically from each other a distance substantially equal to the distance between said junction grooves in said tier, said upper and intermediate registering means interengaging the plates in said ribs and said lower registering means being adapted to engage the two previously formed sections in their junction grooves whereby each mold plate may be accurately positioned with respect to the second previously formed section regardless of the extent the last formed section has settled whereby upon pouring the plastic between said plates the overlapping portion and rib of each of each of said plates is adapted to cooperate with the plastic to complete and perfect the last previously formed section in case of shrinkage.

6. The combination as set forth in claim 5 wherein the upper, intermediate and lower registering means each comprises a rod affixed to the leg of the U clamp in perpendicular relation therewith and wherein the rods are arranged to interengage the ribs in the plate and the groove between the last and next to last section previously formed.

7. The combination as set forth in claim 5 wherein the inverted U-clamp is pivoted at the base of the U, and means are mounted on each side of the pivot point above the legs of the clamp to exert a closing movement of the legs of said U-clamp.

FRAZEUR S. SLATER.

REFERENCES CITED

The following references are of record in the file of this patent:

UNITED STATES PATENTS

| Number | Name | Date |
| --- | --- | --- |
| 803,703 | Milam | Nov. 7, 1905 |
| 845,635 | Ham | Feb. 26, 1907 |
| 952,265 | Le Sueur | Mar. 15, 1910 |
| 953,720 | Stoeser | Apr. 5, 1910 |
| 1,130,647 | Thompson | Mar. 2, 1915 |
| 1,439,826 | League | Dec. 26, 1922 |
| 1,810,777 | McKee | June 16, 1931 |